US009424753B2

(12) United States Patent
Walter

(10) Patent No.: US 9,424,753 B2
(45) Date of Patent: Aug. 23, 2016

(54) SIMPLIFIED USER INTERFACE FOR AN AIRCRAFT

(75) Inventor: Randy Lynn Walter, Grand Rapids, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 756 days.

(21) Appl. No.: 13/179,025

(22) Filed: Jul. 8, 2011

(65) Prior Publication Data

US 2013/0013133 A1 Jan. 10, 2013

(51) Int. Cl.
*G01C 23/00* (2006.01)
*G08G 5/00* (2006.01)

(52) U.S. Cl.
CPC .................................. *G08G 5/0021* (2013.01)

(58) Field of Classification Search
USPC ............ 701/3–4, 14; 340/945, 963–965, 971
See application file for complete search history.

(56) References Cited

U.S. PATENT DOCUMENTS 4,357,661 A 11/1982 Lambregts et al.
4,797,674 A 1/1989 Zweifel et al.
5,412,299 A 5/1995 Gregory et al.
6,711,479 B1 3/2004 Staggs
6,873,903 B2 3/2005 Baiada et al.
7,577,501 B2 * 8/2009 Tafs et al. ....................... 701/14
7,676,303 B2 3/2010 Hanel
8,494,766 B2 7/2013 Walter
2005/0143871 A1 * 6/2005 Boorman et al. ................ 701/3
2008/0312779 A1 12/2008 Sacle et al.
2010/0168936 A1 7/2010 Caillaud et al.
2010/0217510 A1 8/2010 Deker

FOREIGN PATENT DOCUMENTS

EP 1400884 A1 3/2004

OTHER PUBLICATIONS

Search Report and Written Opinion from corresponding EP Application No. 12175429.5 dated Jan. 17, 2013.
Unofficial translation of CN office action, issued on Jun. 2, 2015, for corresponding CN application 201210235131.9.

* cited by examiner

*Primary Examiner* — Yonel Beaulieu
(74) *Attorney, Agent, or Firm* — GE Global Patent Operation; William S. Munnerlyn

(57) ABSTRACT

A user interface for an integrated autopilot and flight management system for an aircraft includes a plurality of tactical parameter controls for operation of the autopilot and a plurality of strategic parameter controls for operation of the flight management system.

19 Claims, 3 Drawing Sheets

SIMPLIFIED USER INTERFACE FOR AN AIRCRAFT

BACKGROUND OF THE INVENTION

Contemporary aircraft may have autoflight systems including a flight management system (FMS), an autopilot system, and an autothrottle system each of which include independent displays and controls. The separate systems have overlapping information and parameters for their separate functions. Each system has its own multi-layer user interface that is presented to the flight crew on a multi-function display (MFD) or other display device. Each system also tends to show a multitude of data regardless of its usefulness. The result is a complex set of layered displays and modes of operation, which are difficult to learn and use efficiently and require significant crew training.

BRIEF DESCRIPTION OF THE INVENTION

In one embodiment, a user interface for an integrated autopilot and flight management system for an aircraft includes a plurality of tactical parameter controls for operation of the autopilot and a plurality of strategic parameter controls for operation of the flight management system. The tactical parameters and the strategic parameters are user-programmable and simultaneously accessible.

DESCRIPTION OF EMBODIMENTS OF THE INVENTION

Figure 1:
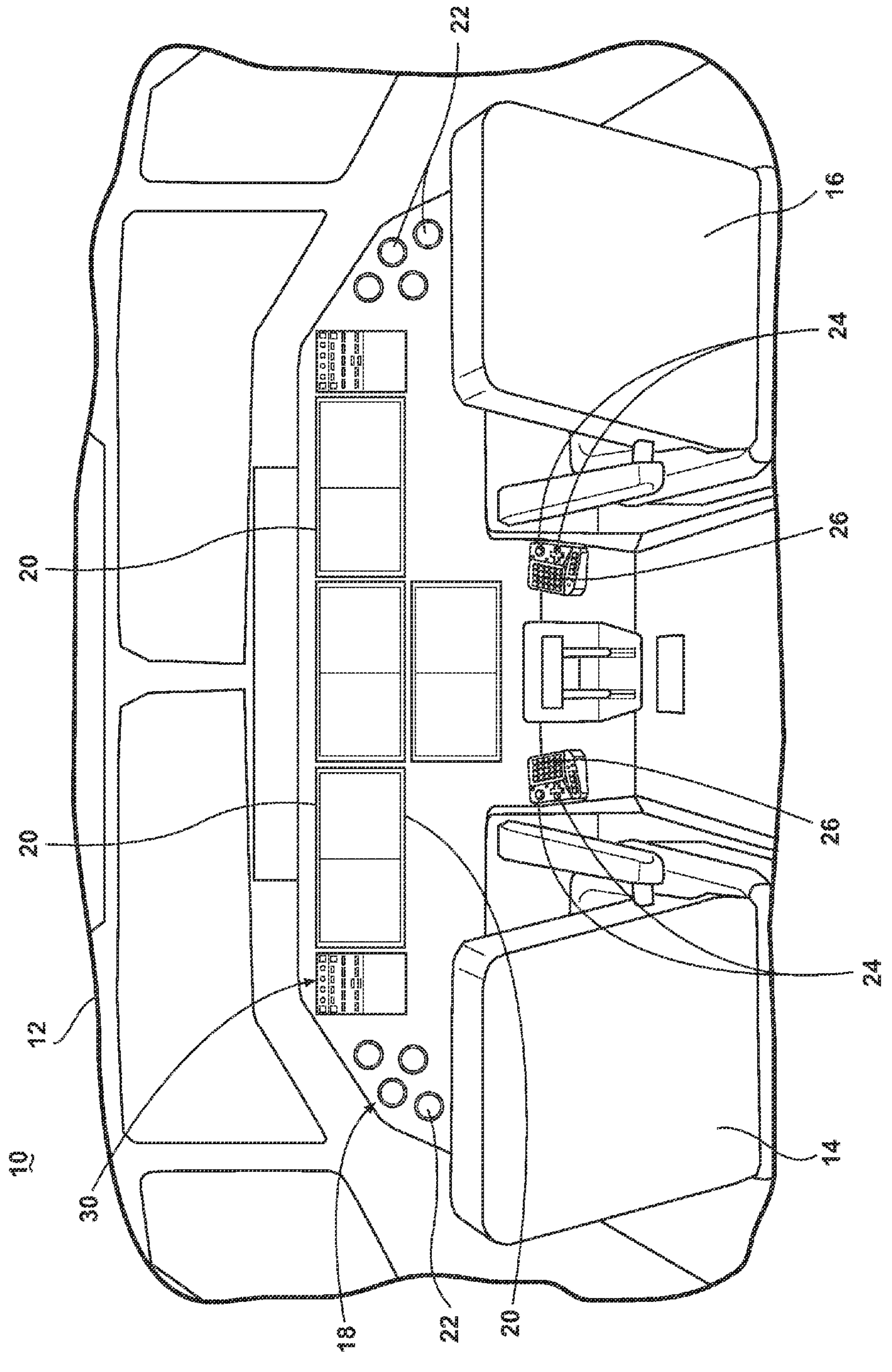
FIG. 1 is a perspective view of a portion of an aircraft cockpit with user interfaces according to a first embodiment of the invention.

FIG. 1 illustrates a portion of an aircraft 10 having a cockpit 12. A first user (e.g., a pilot) may be present in a seat 14 at the left side of the cockpit 12 and another user (e.g., a co-pilot) may be present at the right side of the cockpit 12 in a seat 16. A flight deck 18 having multiple multifunction flight displays 20 and various instruments 22 may be located in front of the pilot and co-pilot and may provide the flight crew with information to aid in flying the aircraft 10.

One or more cursor control devices 24 and one or more multifunction keyboards 26 may be included in the cockpit 12 and may be used by one or more flight crew members, including the pilot and co-pilot, to provide input to a processor (not shown) and interact with the systems of the aircraft. A suitable cursor control device 24 may include any device suitable to accept input from a user and to convert that input to a graphical position on any of the multiple flight displays 20. Various joysticks, multi-way rocker switches, mice, trackballs, and the like are suitable for this purpose and each user may have separate cursor control device(s) 24 and keyboard(s) 26. Through use of the cursor control device(s) 24 and multifunction keyboard(s) 26, the pilot and co-pilot may interact with the data elements graphically and textually in accordance with feedback provided by the multiple displays 20.

One or more user interfaces 30 may be included in the flight deck 18 and for availability a user interface 30 may be provided on each side of the flight deck 18. The user interfaces 30 may be operably coupled with a suitable controller or processor (not shown) such that they may operate to integrate autopilot tactical modes and FMS strategic flight plan for the aircraft 10 such that the operational controls are consolidated and there is no longer a differentiation between the autopilot and FMS modes of operation. The autopilot tactical modes may guide the aircraft 10 without assistance of the pilot. More specifically, the autopilot may abandon a flight path generated by the flight management system and may operate the aircraft based on tactical parameter controls. Such tactical parameter controls may include at least heading, speed, altitude, and vertical speed such that autopilot may control these aspects of the aircraft 10. The FMS may also have controls allowing it to go directly to a next waypoint, hold at various settings, flying the aircraft at an offset trajectory, and meet a required time of arrival among other things. The FMS automates a wide variety of in-flight tasks and one of its primary functions is in-flight management of the flight plan. The flight path trajectory includes a plurality of waypoints and a plurality of vectors that extend between each waypoint of the plurality of waypoints. The FMS may include a processor that is configured to calculate a first flight path trajectory including an origin waypoint and a destination waypoint. Thus, the FMS requires various strategic parameter controls such as a destination location, a departure procedure, enroute segments, taxi route, arrival procedure, and approach procedure. Each user interface 30 may be operably coupled with the cursor control devices 24 and one or more multifunction keyboards 26 such that the flight crew may interact with each user interface 30 and enter in such tactical and strategic parameter controls. The user interface 30 may have a variety of input/output and flight planning elements, which may be implemented by either/both hardware and software, such as dedicated hardware panels, a software generated panel on a general purpose display, a touch panel display for the MFD, dials, lights, knobs, levers, buttons, switches or any combination thereof, to name a few non-limiting examples.

Figure 2:
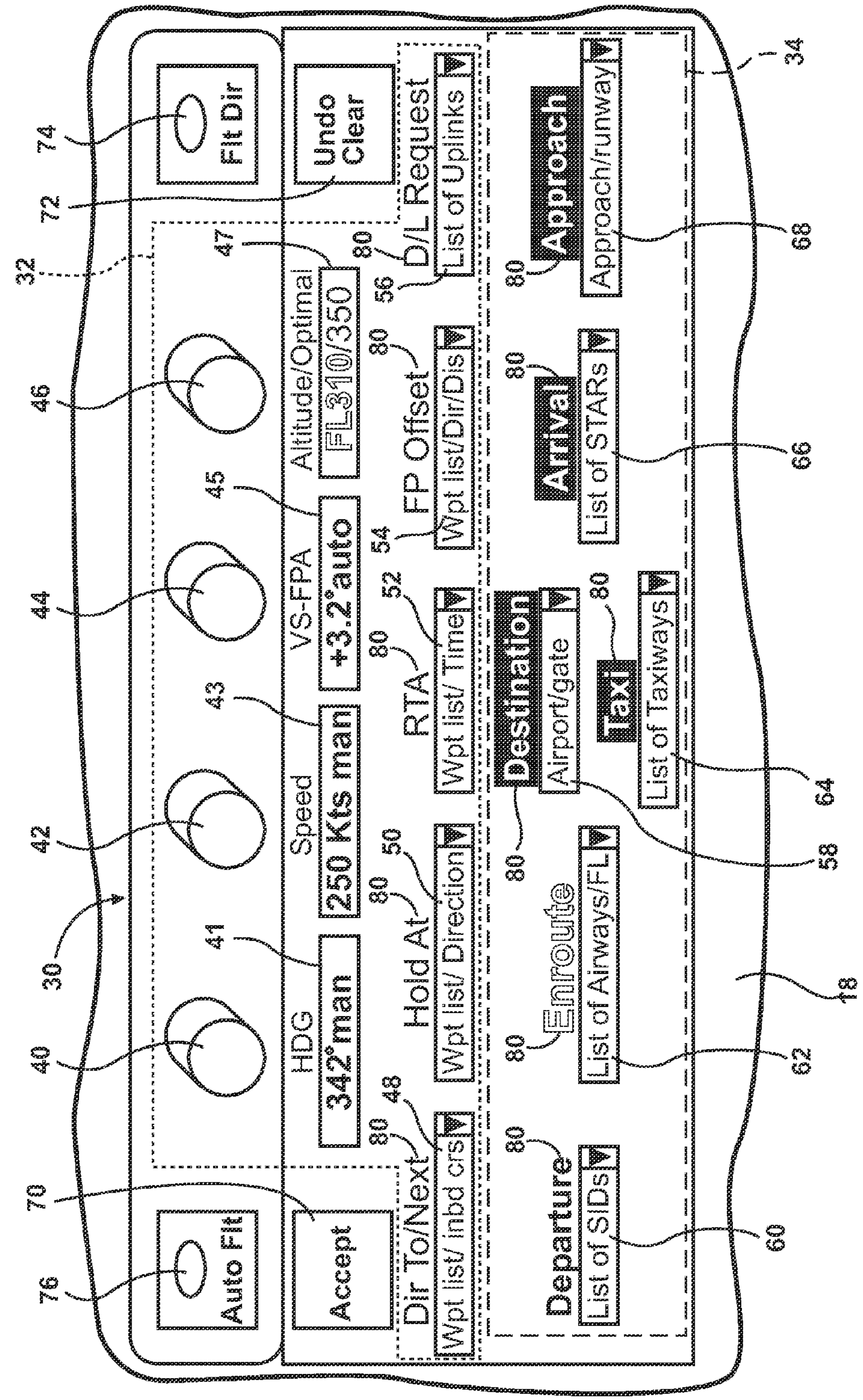
FIG. 2 is a perspective view of a user interface illustrated in FIG. 1.

FIG. 2 illustrates an exemplary user interface 30 according to one embodiment of the invention that combines the tactical parameter controls of the autopilot with the strategic parameter controls of the FMS to provide all of the information and parameter controls for both systems on a simple, one-layer user interface providing simultaneous access to both the tactical and strategic parameter controls. The user interface 30 is more easily able to accomplish the simplification by an underlying combination of the autopilot and FMS, which is described further in commonly-owned patent application entitled, Flight Management System With Integrated Tactical Commands for Use with an Aircraft and Method of Operating Sane, filed Jan. 7, 2011, and assigned U.S. application Ser. No. 12/986,838, which is incorporated by reference. However, the user interface 30 may be implemented in systems where the functionalities of the autopilot and FMS are not combined and retained as operational, stand-alone systems.

More specifically, the user interface 30 has a plurality of tactical parameter controls 32 for operation of the autopilot and a plurality of strategic parameter controls 34 for operation of the flight management system. The tactical parameters and the strategic parameters are user-programmable and simultaneously accessible on the user interface 30 and the user interface 30 allows detailed trajectory information and advisory information to be displayed in conjunction with selections made by the crew on the user interface 30.

The tactical parameter controls 32 and strategic parameter controls 34 may be either hardware controls or software controls. By way of non-limiting example, the tactical parameter controls 32 have been illustrated as including both hardware and software controls. More specifically, the user interface 30 is illustrated as including a panel with tactical control knobs and corresponding displays including, by way of non-limiting example, a heading selection knob 40 and heading display 41, a speed selection knob 42 and speed display 43, a vertical speed or flight path angle (FPA) selection knob 44 and vertical speed/FPA display 45, and an altitude selection knob 46 and altitude display 47. The knobs 40, 42, 44, and 46 may be push rotary knobs. The tactical parameter controls 32 may also include, by way of non-limiting example, a direct to/next waypoint selection window 48, a hold at selection window 50, a required time of arrival at a waypoint selection window 52, an offset flight plan selection window 54, and a data link request selection window 56, all of which may be software generated.

By way of non-limiting example, the strategic parameter controls 34 may include a destination location selection window 58, a departure procedure selection window 60, an enroute segment selection window 62, a taxi route selection window 64, an arrival procedure selection window 66, and an approach procedure selection window 68. It is contemplated that the strategic parameter controls 34 may include more or less selection windows and that the destination location selection window 58 may be the only necessary control for the construction of a flight plan trajectory.

System engage buttons including an accept button 70 and an undo/clear button 72 may also be hardware or software controls included in the user interface 30. A flight director indicator 74 may include suitable indicia and an LED or other suitable light source which may be lit up when the flight director is on and the autopilots are not engaged. Similarly, an auto flight indicator 76 may include suitable indicia and an LED or other suitable light source, which may be lit when the autopilot is engaged.

A status indicator 80 for at least one of the tactical parameter controls 32 and strategic parameter controls 34 may also be included in the user interface 30. By way of non-limiting example, the heading display 41, speed display 43, vertical speed/FPA display 45, and altitude display 47 may serve to act as status indicators for those tactical parameter controls 32. By way of further non-limiting example, indicia related to the remainder of the tactical parameter controls 32 and strategic parameter controls 34 may be capable of being illuminated and may act as status indicators 80 for those controls. The status indicators 80 may indicate whether at least one of the tactical and strategic parameter controls 34 is automatically or manually set. By way of non-limiting example, parameters being actively controlled may be illuminated or highlighted in some fashion.

The status indicators 80 may also indicate whether the at least one of the tactical and strategic parameter controls 34 is: active, armed, or reached a dynamic flight envelope limit. The status indicators 80 may have different illumination states for each status. It is contemplated that the different illumination states may include a different color for each status. Such a color coding scheme may be used to inform the crew which flight parameters are actively being controlled, which flight plan segments are active, and which parameters and/or flight plan segments are armed for activation when captured. Modified plans may be considered armed for activation and all segments could show the color code for being armed. Various color schemes may be used; by way of non-limiting example, green may be used to indicate an active flight parameter or flight plan segment, blue may be used to indicate an armed flight parameter or flight plan segment or modified flight plan, amber may be used to indicate a flight parameter has reached a dynamic flight envelope limit, and magenta may be used to denote a remainder of an active plan or active control.

During operation, the user interface 30 may receive commands and selections from the flight crew through the tactical parameter controls 32 and strategic parameter controls 34 and may present information to the crew such that the user interface 30 becomes the primary crew interface for all autoflight activity including autopilot and FMS. The heading display 41, speed display 43, vertical speed/FPA display 45, and altitude display 47 may define the basic flight control parameters for the aircraft 10 and may default to auto computed values, which may be overridden by crew selection of a manual value. Such manual entry is controlled by the associated heading selection knob 40, speed selection knob 42, vertical speed/FPA selection knob 44, and altitude selection knob 46. More specifically, pushing the corresponding knob selects manual entry for the associated display and rotating the knob may scroll the numerical value at a predetermined or definable increment such that a new value may be selected. The heading selection knob 40 may be turned to control movement in the lateral plane, the speed selection knob 42 may be turned to control airspeed or Mach number, the vertical speed/FPA selection knob 44 may be turned to control movement in the vertical plane, and the altitude selection knob 46 may be turned to control vertical movement. Once the user has selected the desired value the user may select the accept button 70 to activate the manual entry. It is contemplated that if a crew member accidentally pushes one of the knobs that a subsequent push of the knob reverts that tactical parameter control 32 back to auto.

Entering a manual selection using the tactical parameter controls 32 is treated as an input into the flight plan and is reflected in the FMS computed trajectory. The following description represents non-limiting examples of operation of the tactical parameter controls 32. If the heading selection knob 40 is operated, a manual heading may be selected that overrides the FMS computed heading. The flight plan may reflect the manual intervention by assuming an immediate heading vector and predictions may assume a return to strategic flight plan after 1 minute using a course intercept maneuver to the next practical waypoint. Intervening waypoints that are passed may be sequenced from the flight plan. If the speed selection knob 42 is operated, a manual speed may be selected that overrides the FMS computed speed for the current phase. If the vertical speed/FPA selection knob 44 is operated, a vertical speed or flight path angle that overrides the FMS computed vertical profile may be selected. If the altitude selection knob 46 is operated, a next level-off altitude in the profile may be captured and tracked. An advisory of the current computed optimal altitude may be displayed. For all of the above manual selections, the FMS may limit the selectable values to the airplane's dynamic operating envelope and the FMS predictions may use the values as input information.

An entry in the direct to/next waypoint selection window 48 may result in the navigation display rendering a new path to the selected waypoint and the ETA associated with that waypoint. Changes made into the hold at selection window 50 may result in a navigation display rendering the selected hold pattern along with an ETA to enter and ETA to exit after one cycle. A user entry into a required time of arrival at a waypoint selection window 52 may render on the navigation display the minimum and maximum ETA that can be achieved for that waypoint. An entry into the offset flight plan selection window 54 may result in the navigation display rendering a new parallel flight path as well as retaining the original path showing the selected departure point and rejoin point and associated ETAs. The data link request selection window 56 may allow the crew to initiate data link operations for air/ground data communications and to request flight planning elements, ATC clearances, and other uplinks as well as manually triggered downlinks. Through the data link request selection window 56 a user may select to log on, which automatically triggers the appropriate information exchange to commence data communication activity.

It is contemplated that any of the selection windows of the tactical parameter controls 32 and strategic parameter controls 34 may accept uplinked flight planning elements/clearance instructions as well as crew selections. Uplinked elements may be auto loaded as a modified flight plan into the appropriate window(s) and flash, prompting the crew to accept the data, through the accept button 70, or reject the data, through the undo/clear button 72. An automatic downlink may be generated that reflects the crew response to the data linked message. Uplinks may also be accompanied by an audible or visual alert to draw the attention of the crew to the pending data. The uplinks may be displayed as pop-up dialog windows on the user interface 30 containing the appropriate actions or selections relevant to that specific data communication.

The strategic parameter controls 34 may define various flight plan elements that form a complete flight plan. It is contemplated that only a destination or a destination and a departure runway may be required to produce an active flight trajectory. The strategic parameter controls 34 including the destination location selection window 58, departure procedure selection window 60, enroute segment selection window 62, taxi route selection window 64, arrival procedure selection window 66, and approach procedure selection window 68 may include menus and lists from which a user may select an item or items to be entered. Selection of items in the windows may be achieved using the cursor control device 24. Alternatively, it has been contemplated that the user interface 30 may be a touchscreen and that selection of items may be achieved through interaction with the touchscreen. Selection of such items creates a modified flight plan that, after review, may be accepted through selection of the select button 70. By way of non-limiting example, the selections may be undone one item at a time with a short push of the undo/clear button 72 or all of the items may be cleared if the undo-clear button 72 is pushed and held.

Figure 3:
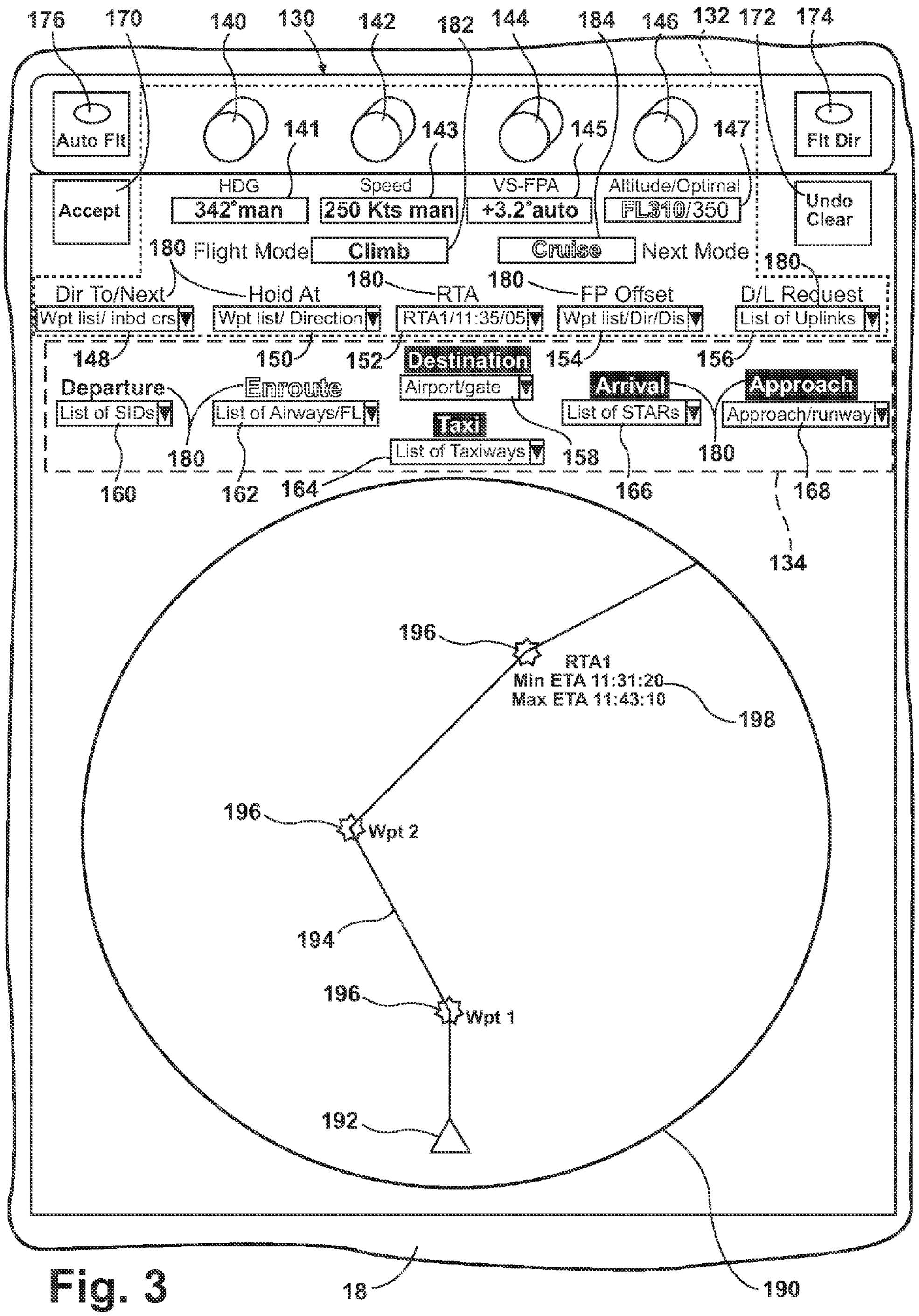
FIG. 3 is a perspective view of a user interface according to a second embodiment of the invention and which may be used in the aircraft illustrated in FIG. 1.

FIG. 3 illustrates that a user interface 130 having a navigation map or navigation display 190 according to a second embodiment of the invention. The second embodiment 130 is similar to the first embodiment 30. Therefore, like parts will be identified with like numerals increased by 100, with it being understood that the description of the like parts of the first embodiment applies to the second embodiment, unless otherwise noted.

One difference between the first embodiment 10 and the second embodiment 100 is that the inclusion of a current flight mode window 182 as well as a next flight mode window 184, and the interactive navigation display 190, which may display a trajectory, which is the result of crew inputs through the user interface 130. By way of non-limiting example, the navigation display 190 is illustrated as including an aircraft symbol 192, a predicted flight path 194 having various waypoints 196, and trajectory information 198. The navigation display 190 may allow detailed trajectory information such as latitude, longitude, altitude, speed, ETA, fuel remaining, etc., and advisory information to be displayed in conjunction with selections made by the crew on the user interface 130. By way of non-limiting examples, additional flight plan editing, waypoint creation/deletion, flight plan leg linking, selection of alternate airports, entry of speed/alt constraints, navigation sensor comparisons, etc. may be performed through object manipulation and menu selections on the navigation display 190. It is also contemplated that advisory and alert messages may pop-up in a dialog box that contains the appropriate actions or selections to resolve the issue.

The above described embodiments bring together the tactical, strategic, and data link controls, which were previously implemented independently of each other and results in a simplified crew interface layout. Further, the above described embodiments eliminate the functional redundancies of the systems, minimize the displays and controls, eliminate superfluous information not necessary for the effective operation of the aircraft and reduce both interface complexity and equipment cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A user interface for an autopilot and flight management system for an aircraft, comprising:

a plurality of tactical parameter controls for operation of the autopilot;

a plurality of strategic parameter controls for operation of the flight management system; and wherein the tactical parameter controls and the strategic parameter controls are integrated into a single user interface and are user-programmable and simultaneously accessible.

2. The user interface of claim 1 wherein the tactical parameter controls comprise at least heading, speed, altitude, and vertical speed, and the strategic parameter controls comprise at least a destination location.

3. The user interface of claim 2 wherein the tactical parameter controls further comprise at least one of: direct to, next waypoint, hold at, offset, required time of arrival, and data link; and the strategic parameter controls further comprise at least one of a departure procedure, enroute segments, taxi route, arrival procedure, and approach procedure.

4. The user interface of claim 1 wherein a least some of the tactical parameter controls and strategic parameter controls are at least one of a hardware control or a software control.

5. The user interface of claim 4 wherein at least some of the tactical parameter controls are hardware controls.

6. The user interface of claim 5 wherein the tactical parameter controls comprise hardware controls including at least: heading, speed, altitude, and vertical speed.

7. The user interface of claim 6 wherein the strategic parameter controls comprise software controls including at least: departure procedure, enroute segments, destination, taxi route, arrival procedure, and approach procedure.

8. The user interface of claim 7 wherein data linked tactical and strategic flight plan elements are loaded into corresponding tactical and strategic software controls.

9. The user interface of claim 8, further comprising an acceptance button and a rejection button and wherein a user may respond to the data linked elements through at least one of the acceptance and rejection buttons.

10. The user interface of claim 9 wherein the acceptance button and the rejection button are user operable to control manual flight plan edits.

11. The user interface of claim 9 wherein an automatic downlink is generated that reflects a user response to the data linked message.

12. The user interface of claim 7, further comprising a navigation map.

13. The user interface of claim 12 wherein the navigation map displays advisory information in conjunction with user selections made on the user interface.

14. The user interface of claim 1, further comprising a status indicator for at least one of the tactical and strategic parameter controls.

15. The user interface of claim 14 wherein the status indicator indicates whether the at least one of the tactical and strategic parameter controls is automatically or manually set.

16. The user interface of claim 15 wherein the status indicator indicates whether the at least one of the tactical and strategic parameter controls is: active, armed, and reached a flight envelope limit.

17. The user interface of claim 16, further comprising a status indicator that indicates a remainder of an active control.

18. The user interface of claim 16 wherein the status indicator comprises indicia having a different illumination state for each status.

19. The user interface of claim 18 wherein the different illumination state comprises a different color for each status.

* * * * *